United States Patent [19]

Maruyama

[11] Patent Number: 4,523,500
[45] Date of Patent: Jun. 18, 1985

[54] METHOD AND APPARATUS FOR CUTTING CONTINUOUS CORRUGATED MEMBER

[75] Inventor: Kimio Maruyama, Kariya, Japan
[73] Assignee: Nippondenso Co., Ltd., Kariya, Japan
[21] Appl. No.: 484,991
[22] Filed: Apr. 14, 1983
[30] Foreign Application Priority Data
  Apr. 14, 1982 [JP]  Japan .................................. 57-60864
[51] Int. Cl.³ ............................................. B26D 1/56
[52] U.S. Cl. .......................................... 83/37; 83/176;
    83/287; 83/289; 83/320; 83/363; 83/402
[58] Field of Search ........................... 83/37, 318–320,
    83/286, 287, 289, 363, 365, 369, 371, 293, 589,
    402, 51, 623, 557, 310, 18–21, 175, 176;
    72/185–187

[56] References Cited
U.S. PATENT DOCUMENTS

| | | | |
|---|---|---|---|
| 1,849,944 | 3/1932 | Medville | 72/186 |
| 2,975,817 | 3/1961 | Neff | 72/185 |
| 3,306,144 | 2/1967 | Nordgren | 83/319 |
| 3,364,957 | 1/1968 | Guess | 72/185 |
| 3,367,161 | 2/1968 | Avakian | 72/185 |
| 3,667,268 | 6/1972 | Rech | 72/185 |
| 3,744,362 | 7/1973 | Gesell et al. | 83/589 |
| 3,850,018 | 11/1974 | Drosnin | 72/187 |
| 3,911,773 | 10/1975 | Inowaki | 83/820 |
| 3,991,663 | 11/1976 | Glasby | 83/289 |
| 4,311,034 | 1/1982 | Hall | 72/187 |
| 4,407,179 | 10/1983 | Iwase | 83/320 |

Primary Examiner—James M. Meister
Assistant Examiner—John L. Knoble
Attorney, Agent, or Firm—Cushman, Darby & Cushman

[57] ABSTRACT

A method and apparatus for cutting a continuous corrugated member while conveying it in a longitudinal direction thereof, in which a movable cutter blade is moved forward in the same direction as the conveying direction of the corrugated member at the same speed as the conveying speed of the corrugated member. The cutter blade is also reciprocated to cut the corrugated member when the cutter blade is moved forward.

20 Claims, 19 Drawing Figures

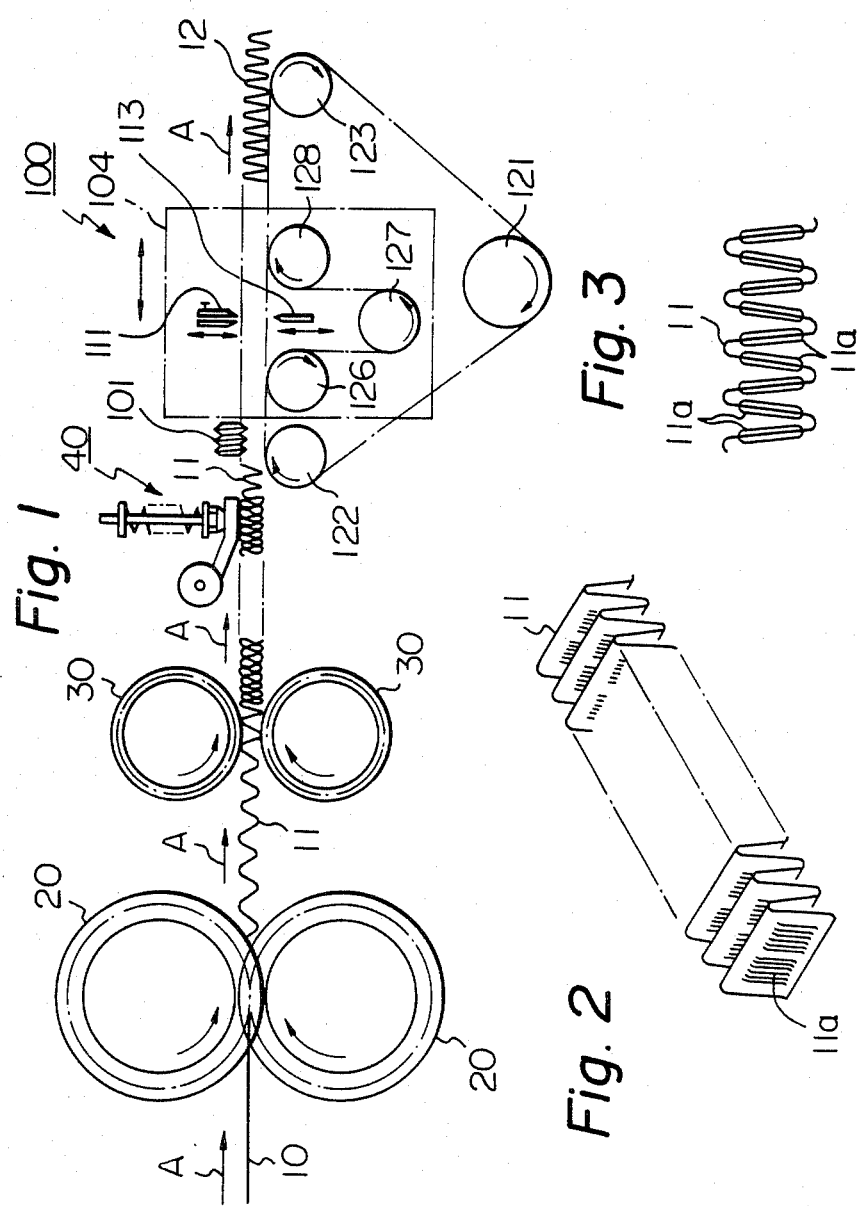

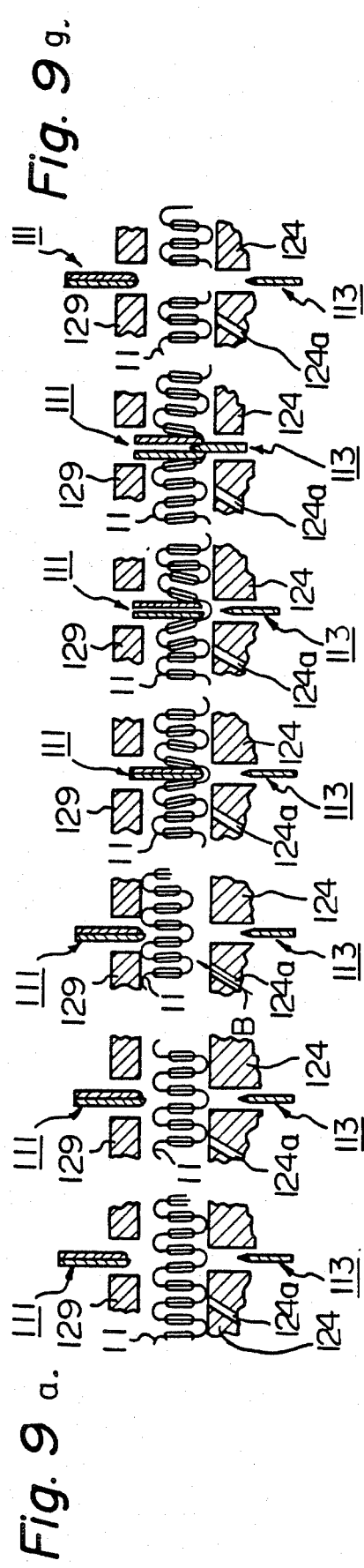

METHOD AND APPARATUS FOR CUTTING CONTINUOUS CORRUGATED MEMBER

BACKGROUND OF THE INVENTION

1. Field of the Invention

The present invention relates to a method and apparatus for cutting a continuous corrugated member, for example, a louver-forming corrugated fin for a heat exchanger, for example, an automobile radiator.

2. Description of the Prior Art

Recently, it has been desired to reduce the weight and manufacturing cost of heat exchangers, such as automobile radiators. For this purpose, various attempts have been made to increase the heat radiation per unit weight of heat exchangers. In one method, the width of the corrugated fin used for the radiator core is narrowed, the pitch or distance between adjacent crest portions on one side face of the corrugated fin is reduced, and the number of crest portion is correspondingly increased. There has already been proposed a corrugated fin with a width ½, a pitch about ½, and a number of crest portions about two times that of conventional corrugated fins.

The process for the preparation of corrugated fins ordinarily comprises the steps of forming a thin strip member into a continuous corrugated member, contracting the pitch of the corrugated member, and cutting the corrugated member into sections having a predetermined number of crest portions.

The latter two steps may be reversed, i.e., the corrugated member may be cut before the contraction or cut after the contraction.

In cutting before contraction, a thin strip member is formed by rollers into a continuous corrugated member having a crest pitch larger than that of a final product. The continuous corrugated member is then conveyed in a longitudinal direction thereof and cut into sections having a predetermined number of crest portions by a cutting device. The pitch of the corrugated member is then contracted by a contracting device.

In cutting after contraction, a thin strip member is formed by rollers into a continuous corrugated member having a crest pitch larger than that of a final product. The corrugated member is then conveyed in a longitudinal direction thereof and contracted to a predetermined crest pitch by a contracting device. The corrugated member is then cut into sections having a predetermined length by a cutter device.

Conventional methods for cutting a continuous corrugated member include scissors cutting and punch cutting. In scissors cutting, a stationary cutter and a moving cutter, each having a relatively large thickness, are used together to cut the corrugated member. Scissors cutting is suitable for cutting a corrugated member having a large pitch and is mainly adopted for cutting before contraction. In punch cutting, a thin moving cutter is inserted into a slit formed on one end of a stationary cutter. Punch cutting is suitable for cutting a corrugated member having a small pitch and is mainly adopted for cutting after contraction.

In conventional cutting before contraction with scissors cutting, the corrugated member can be cut irrespective of the pitch of the final product. However, since the cut end of the corrugated member has to be introduced between a pair of feed rollers after the corrugated member has been cut, the feed of the corrugated member into the space between the rollers becomes unreliable upon an increased speed of manufacturing the corrugated fin, i.e., speed of conveying crest portions of the corrugated member per unit time.

In conventional cutting after contraction with punch cutting, since louvers are usually simultaneously formed on the continuous corrugated member, it is necessary to insert the moving cutter between the louvers of the corrugated member. However, when the cutter inserted to cut a corrugated member having a narrow pitch width, for example, a crest pitch corresponding to ½ of the pitch of a conventional corrugated fin, the gap between the two louvers of the corrugated member is smaller than the thickness of an ordinary moving cutter. Therefore, when trying to insert the moving cutter between the two louvers, the louvers are caught on the cutting edge portion of the moving cutter and the corrugated member is crushed. If the thickness of the moving cutter is reduced, the resultant moving cutter becomes subject to vibration and is reduced in strength.

Moreover, in conventional cutting after contraction, the position of the cutting device with respect to the conveying direction of the corrugated member is fixed and that fixed cutting device cuts the corrugated member while the member is moving. Therefore, the moving cutter must complete its descent and ascent during the passage of one crest portion of the corrugated member. Conversely, the conveying speed of the corrugated member is limited by the speed of the descent and ascent of the moving cutter. In practice, the conveying speed is thus limited to about 4000 crest portions per minute. Therefore, when it is intended to obtain a corrugated fin having a crest pitch corresponding to about ½ of the pitch of a conventional corrugated fin, it takes twice as long to form one corrugated fin as with a conventional corrugated fin. This means productivity drastically reduced of the corrugated fins and increased manufacturing cost.

SUMMARY OF THE INVENTION

It is a primary object of the present invention to provide a method and apparatus for cutting a continuous corrugated member, such as a corrugated fin for a heat exchanger, in which the foregoing defects of the conventional technique are eliminated and the speed of cutting the corrugated member is remarkably increased.

Another object of the present invention is to provide a method and apparatus for cutting a continuous corrugated member which is suitable for cutting after contraction.

In accordance with one aspect of the present invention, there is provided a method for cutting a continuous corrugated member into a predetermined length, the corrugated member having on each side face thereof a plurality of crest portions and trough portions extending in a direction perpendicular to a longitudinal direction thereof. The method comprises the steps of: conveying the corrugated member in the longitudinal direction of the corrugated member at a constant speed; providing a movable cutter blade having thereon a sharpened edge which extends in a direction perpendicular to the longitudinal direction of the corrugated member and is located near one side face thereof; moving the cutter blade forward from a predetermined rest position thereof in the conveying direction of the corrugated member at the same speed as the conveying speed thereof when a predetermined length of the corrugated member passes in front of the sharpened edge of the cutter blade; lowering and raising the cutter blade in a direction perpendicular to the conveying direction of the corrugated member and perpendicular to the extending direction of the crest portions for cutting the corrugated member while the cutter blade is moved forward; and returning the cutter blade to its rest position.

In accordance with another aspect of the present invention, there is provided an apparatus for cutting the above continuous corrugated member into a predetermined length. The apparatus comprises: a means for conveying the corrugated member in the longitudinal direction of the corrugated member at a constant speed; a carriage capable of moving back and forth in a direction parallel to the conveying direction of the corrugated member; a movable cutter blade movably supported on the carriage in a direction perpendicular to the conveying direction and to the extending direction of the crest portions of the corrugated member, the cutter blade having thereon a sharpened edge which is located near one side face of the corrugated member and extends perpendicular to the conveying direction of the corrugated member; a drive means for moving forward the cutter blade together with the carriage from a rest position thereof in the conveying direction of the corrugated member at the same speed as the conveying speed thereof when a predetermined length of the corrugated member passes in front of the sharpened edge of the cutter blade and for returning the cutter blade to its rest position together with the carriage; and a cutter-reciprocating means for moving the cutter blade in a direction perpendicular to the conveying direction of the corrugated member for cutting the corrugated member when the cutter blade is moved forward.

BRIEF EXPLANATION OF THE DRAWINGS

These and other objects and features of the present invention will become apparent from the following detailed description made with reference to the accompanying drawings; wherein:

FIG. 1 is a front schematic view of an apparatus for cutting the continuous corrugated member according to the present invention, applied to cutting after contraction;

FIG. 2 is a partial perspective view of a continuous louver-forming corrugated member to be cut by the cutting apparatus;

FIG. 3 is a front view of the corrugated member shown in FIG. 2;

FIGS. 9(a) through 9(g) are sectional views of the relationships of a cutter blade and cutter receiver to the corrugated member during the cutting cycle in the apparatus shown in FIG. 4; and FIGS. 10(a) and 10(b) are views of the operations when a slit is formed in advance in the round edge portion of the cutter receiver in the apparatus shown in FIG. 4.

DESCRIPTION OF THE PREFERRED EMBODIMENT

Figure 4:
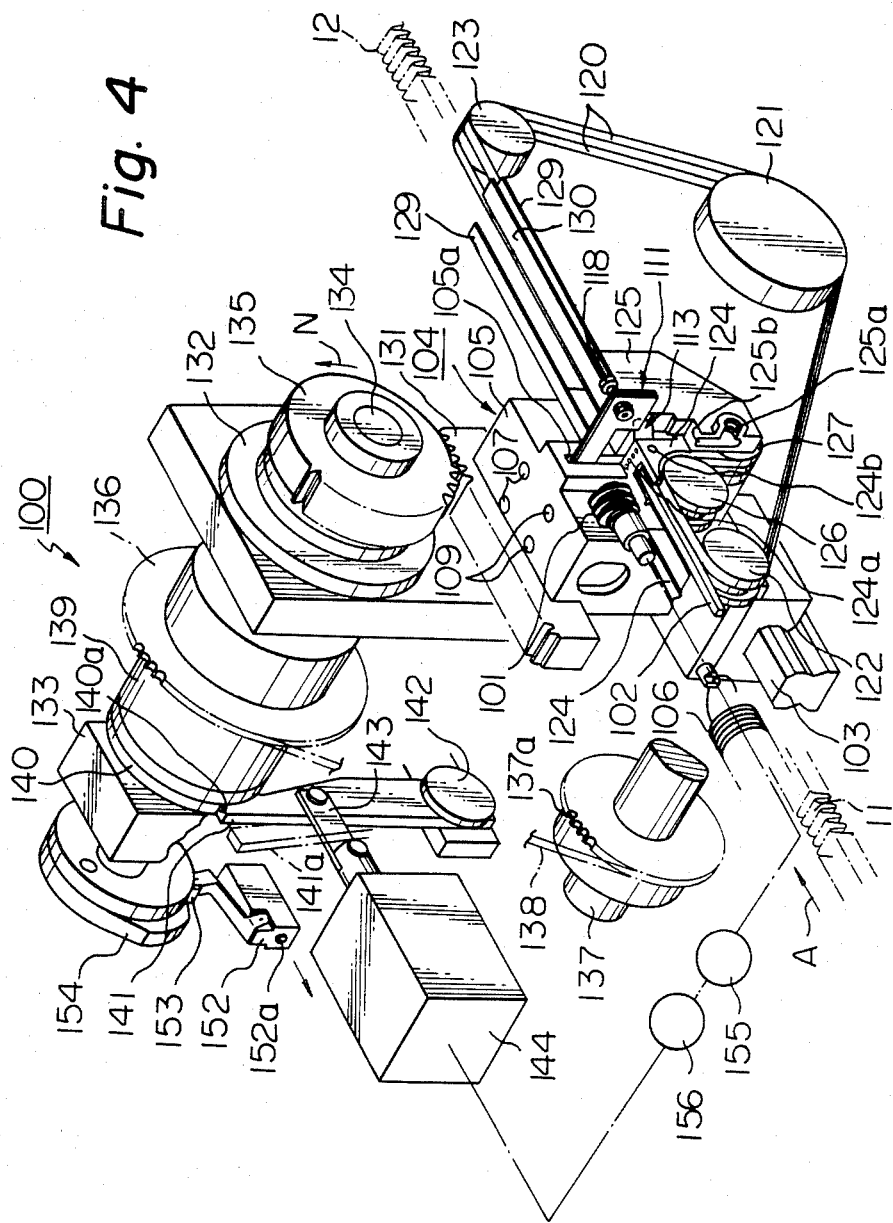
FIGS. 4 and 5 are partial perspective views of the cutting apparatus shown in FIG. 1.

Referring to FIG. 1, a continuous thin strip member 10 is formed by two rollers 20 into a continuous corrugated member 11 having a plurality of crest portions and trough portions formed on each side face thereof, the crest pitch of the corrugated member being larger than that of a final product. A plurality of louvers 11a, shown in FIGS. 2 and 3, are also formed on the inclined face portions of the corrugated member 11 by the rollers 20. The corrugated member 11 is delivered by the molding rollers 20 and is successively fed forward by feed rollers 30 in the horizontal direction of arrow A. The pitch of the corrugated member 11 is contracted to that of the final product by a contracting device 40. The corrugated member 11 is fed to a cutting device 100 designed in accordance with the present invention. In the cutting device 100, the corrugated member 11 is cut by a cutter blade 113 while conveyed by conveying device 101, 120 in the conveying direction at a predetermined constant speed, whereby a corrugated fin 12 having a predetermined crest pitch and a predetermined number of crest portions is obtained. The corrugated fin 12 is fed forward in the direction of arrow A.

Referring to FIG. 4, the cutting device 100 comprises a worm gear 101 for conveying the corrugated member 11 crest by crest. The worm gear 101 is engaged with the crest portions on the upper side face of the corrugated member 11. A guide bar 102 for receiving the lower side face of the corrugated member 11 is arranged under the worm gear 101. The positions of the worm gear 101 and guide bar 102 are fixed with respect to the conveying direction of the corrugated member 11.

A rail shaft 103 is stationarily arranged in parallel with the conveying direction of the corrugated member 11. A carriage 104 comprises a casing 105 which is smoothly slidably supported on the rail shaft 103. The casing 105 is pulled in a direction opposite to the direction of arrow A by a spring 106 and is located at a rest position at which the casing 105 abuts a stationary stopper (not shown).

Figure 5:
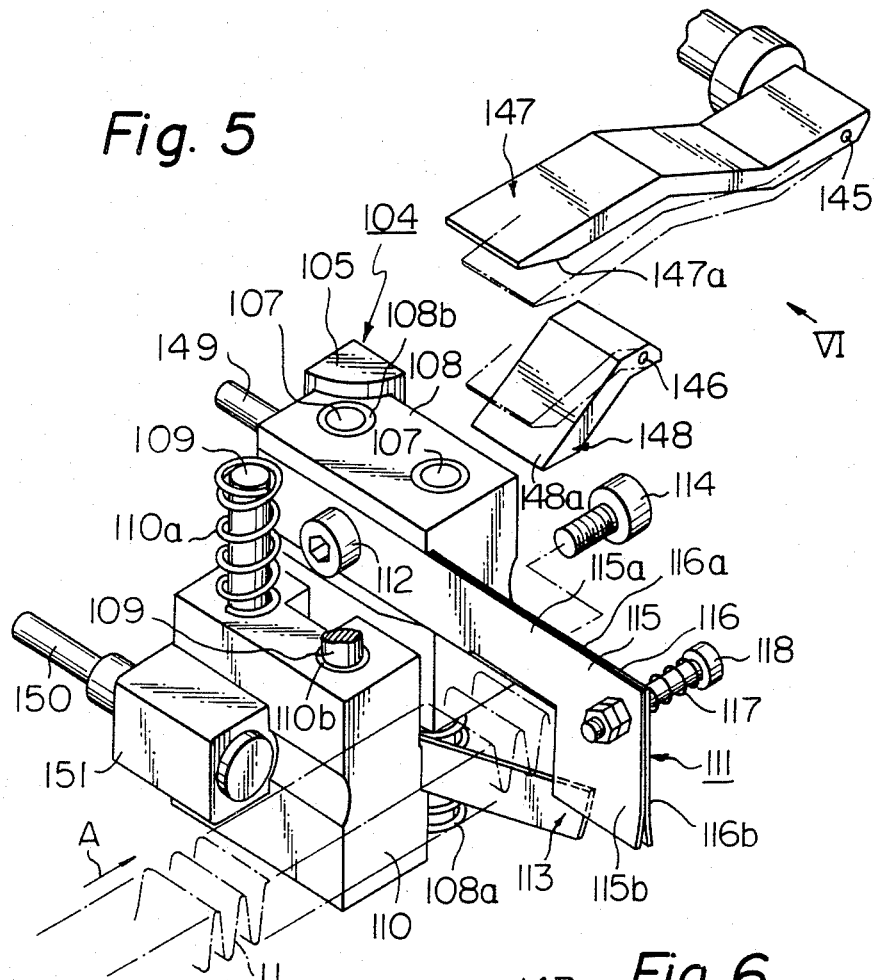

As shown in FIG. 5, within the casing 105, there are arranged a receiver support block 108 attached slidably in the vertical direction while being guided by two guide pins 107, and a cutter support block 110 attached slidably in the vertical direction while being guided by two guide pins 109. The guide block 108 is pressed against the top face of the inner side of the casing 105 by a spring 108a, and the guide block 110 pressed against the lower face of the inner side of the casing 105 by a spring 110a. Bearings 108b and 110b are arranged between the guide blocks 108, 110 and the guide pins 107, 109, respectively.

The base end portion of the cutter receiver 111 is secured to the guide block 108 by a bolt 112, and the base end portion of the cutter blade 113 is secured to the guide block 110 by a bolt 114.

As shown in FIG. 4, the cutter receiver 111 and the cutter blade 113 extend outward through a slit 105a formed on the casing 105. The corrugated member 11 is passed through the space between the cutter receiver 111 and the cutter blade 113 on the outside of the slit 105a.

As shown in FIG. 5, the cutter receiver 111 is formed of two L-shaped thin plates 115 and 116 with horizontal extensions 115a and 116a and with lower extensions 115b and 116b which extend downward from the top ends of the horizontal extensions 115a and 116a, respectively. Above the lower extensions 115b and 116b, there are arranged a coil spring 117 for narrowing the slit between the two plates 115 and 116 and a adjusting device 118 for adjusting the weight to be attached to the coil spring 117.

Figure 7A:
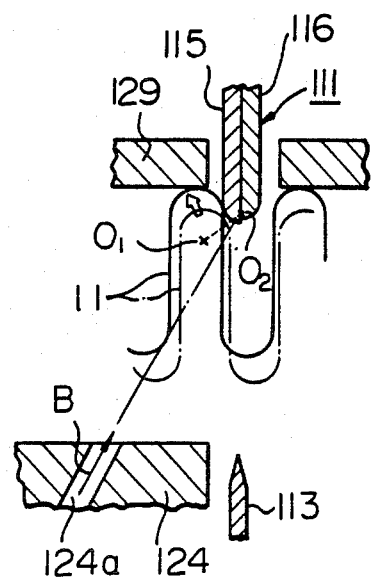
FIGS. 7(a), 7(b), and 7(c) are sectional views of parts of the apparatus shown in FIG. 4, which illustrate the motion of the corrugated member under ejection on an air jet.

The top end portion of the cutter blade 113 is gripped between the lower extensions 115b and 116 b of the plates 115 and 116. Each lower end of the horizontal extensions 115a and 116a of the two plates has a rounded edge having a radius substantially equal to the radius of the arc of the trough portion of the corrugated member 11, as shown in FIG. 7(a). A vertical step is formed between the rounded edges of the horizontal extensions 115a and 116a. The rounded edge of the horizontal extension 115a is thus slightly higher than that of the horizontal extension 116a. A slit is formed between the two plates 115 and 116. This slit is opened as the cutter blade 113 rises.

In FIG. 4, reference numerals 120 represent auxiliary conveying belts moved at the same speed as that of the corrugated member 11 while supporting the lower side face of the corrugated member 11 before and after the carriage 104. The belts 120 are wound on stationary pulleys 121, 122, and 123 and are driven by the pulley 121. A supporting block 124 is secured to the casing of the carriage 104 to support the lower side face of the corrugated member 11 before and after the cutter blade 113. Movable pulleys 126, 127, and 128 (128 only shown in FIG. 1) are arranged between a cover plate 125 secured to the supporting block 124 and the casing 105 to guide the conveying velts 120. Side guide plates 129 are secured to the casing 105 and cover plate 125 to support both the side edges of the corrugated member 11. An upper guide plate 130 is secured to the cover plate 125 to support the upper side face of the corrugated member 11.

As shown in FIG. 4, a rack 131 is secured to the upper portion of the casing 105, and a partially untoothed pinion 135 is secured to a clutch shaft 134 rotatably supported on bearing boxes 132 and 133.

A sprocket 136 is rotatably supported on the clutch shaft 134 through a bearing (not shown) arranged in the sprocket 136. The sprocket 136 is connected through a chain 138 to a sprocket 137a secured to a drive shaft 137, the position of which is fixed. The drive shaft is connected to a power source such as a motor (not shown). A one-way clutch 139 for establishing and breaking the connection between the drive shaft 137 and the clutch shaft 134 is arranged between the sprocket 136 and the clutch shaft 134. The one-way clutch 139 has a trip cam 140. When a knock plate 141 abuts on the trip cam 140, the sprocket 136 and clutch 134 are in the disconnecting state and the clutch shaft 134 is stopped.

The knock plate 141 is pivotably attached to a stationary supporting pin 142 at the base end thereof and is pulled toward the trip cam 140 by a spring (not shown). The knock plate 141 is connected to a stationary solenoid 144 through a link 143. When the solenoid 144 is actuated, the knock plate 141 is displaced to a position 141a through the link 143 and is detached from the trip cam 140. At this point, the one-way clutch 139 falls in the connecting state and the clutch shaft 134 is rotated integrally with the sprocket 136. Since the solenoid 144 is de-energized before the clutch shaft 134 makes one rotation, the knock plate 141 abuts on a step 140a of the trip cam 140 when the clutch shaft 134 makes one rotation, whereby the clutch shaft 134 is stopped. The above-mentioned structural elements 131 through 144 constitute parts of the drive means for moving the carriage 104 provided with the cutter blade 113 and cutter receiver 111 in a direction parallel to the conveying direction of the corrugated member 11.

A shown in FIG. 5, a cam plate 147 for controlling the cutter receiver 111 and a cam plate 148 for controlling the cutter blade 113 are secured stationary supporting pins 145 and 146, respectively. The pins 145 and 146 are arranged on a stationary frame (not shown) in the front portion of the casing. A guide pin 149 is rotatably attached to the guide block 108 through a bearing (not shown). This guide pin 149 runs on the cam face 147a of the cam plate 148 when the guide block 108 moves forward together with the carriage 104. A guide pin 150 is rotatably attached to the guide block 110 through the bearing 151 and runs on the cam face 148a of the cam plate 148 when the guide block 110 moves forward together with the carriage 104.

Figure 6:
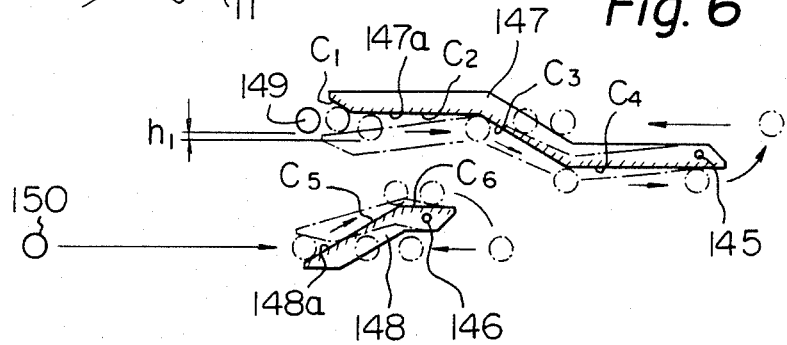
FIG. 6 is a view of a part of the cutting apparatus seen in the direction of arrow VI in FIG. 5.

As shown in FIGS. 5 and 6, the cam plates 147 and 148 can be rotated about the axes of the supporting pins 145 and 146, respectively. The cam plate 147 abuts against a stationary stopper (not shown) at the position indicated by a solid line. It cannot be rotated upward beyond this position, but can be rotated downward below this position against the force of a pulling spring (not shown). The cam plate 148 abuts also against a stationary stopper (not shown) at the position indicated by a solid line. The cam plate 148 cannot be rotated downward below this position, but can be rotated upward beyond this position against the force of a pulling spring (not shown).

The cam face 147a of the cam plate 147 consists of a first inclined face portion $C_1$, a first horizontal face portion $C_2$, a second inclined face portion $C_3$, and a second horizontal face portion $C_4$.

When the carriage 104 is moved forward from the rest position, the guide pin 149 runs on the first inclined force portion $C_1$, travels through the first horizontal face portion $C_2$ and the second inclined face portion $C_3$ from the first inclined face portion $C_1$, arrives at the second horizontal face portion $C_4$, separates from the cam face 147a, and rises. When the carriage 104 is drawn back from the end position of the forward stroke, the guide pin 149 is returned to the rest position without changing the height thereof while pressing down the cam plate 147.

The cam face 148a of the cam plate 148 consists of an inclined face portion $C_5$ and a horizontal face portion $C_6$.

When the guide pin 149 shifts from the second inclined face $C_3$ to the second horizontal face portion $C_4$, the guide pin 150 runs on the inclined face $C_5$, shifts to the horizontal face portion $C_6$, separates from the cam face 148, and descends. When the carriage 104 is drawn back from the end position of the forward stroke, the guide pin 149 is returned to the rest position without changing the height thereof while pressing up the cam plate 148.

A shown in FIG. 4, a plurality of air ejecting holes 124a are formed on the top face of the supporting block 124 on the rear side of the cutter blade 113. The air ejecting holes 124a are communicated with a hole 125a formed on the cover plate 125 through passage 124b and 125b. The hole 125b leads to an air outlet hole 152a of a stationary mechanical air valve 152 through a flexible hose (not shown). The valve 152 is provided with a roller lever 153. A dog 154 acting on the roller lever 153 is secured to the clutch shaft 134. When the roller lever 153 is pressed down by the dog 154, an air path (not shown) in the valve 152 is opened. Thus, compressed air is supplied from the air outlet hole 152a of the valve 152 through the flexible hose, the hole 125a, and the passages 125b and 124b and is ejected out from the air ejecting holes 124a. The air ejecting holes 124a are formed on the supporting block 124 so that air jet is ejected slanted forward from the lower side face of the corrugated member 11 from below the corrugated member, as indicated an arrow B in FIG. 7(a).

A detecting device 155 for detecting the number of crests of the corrugated member 11 by detecting the rotational speed of the worm gear 101 is connected to the worm gear 101. A counter 156 is connected to the detecting device 155 so as to count detection signals from the detecting device 155 and is formed so as to supply an operation signal into the solenoid 144 when a predetermined number of the crest portions is counted. When the knock plate 141 is disengaged from the step 140a of the trip cam 140 by virtue of the pulling operation of the solenoid 144, a limit switch (not shown) is turned off, and then the solenoid 144 is de-energized.

The cutting method using the above-mentioned cutting apparatus 100 will now be described.

When the counter 156 counts the predetermined number of crests based on the signals from the detecting device 155 and sends the operation signal to the solenoid 144, the solenoid 144 is excited, whereby the knock plate 141 is disengaged from the step 140a of the trip cam 140 of the one-way clutch 139 and the pinion 135 is caused to make one rotation in the direction indicated by arrow N in FIG. 4. By this rotation, the pinion 135, is immediately engaged with the rack 131, and the carriage 104 is driven at the same speed as the conveying speed of the corrugated member 11 in the direction of the arrow A until the untoothed portion 135a of the pinion 135 turnes to the rack 131 and the gears are disengaged. Then, the carriage 104 is returned to the rest position by the spring 106 and is held at the rest position until the subsequent operation signal is sent to the solenoid 144. Cutting of the corrugated member 11 is performed while the carriage 104 is driven and moved forward in the direction of arrow A by the pinion 135.

The cutting operation in the above-mentioned embodiment will now be described with reference to the time chart shown in FIG. 8 and to FIGS. 9(a) through 9(g).

When the pinion 35 is rotated by $\theta_1$ from the original position, it engages with the rack 131, and the carriage 104 begins to move in the direction of arrow A at the same speed as that of the corrugated member 11. At this time, the cutter receiver 111 is held at the highest position of its vertical stroke and the cutter blade 113 is held at the lowest position of its vertical stroke, as shown in FIG. 9(a).

Figure 8:
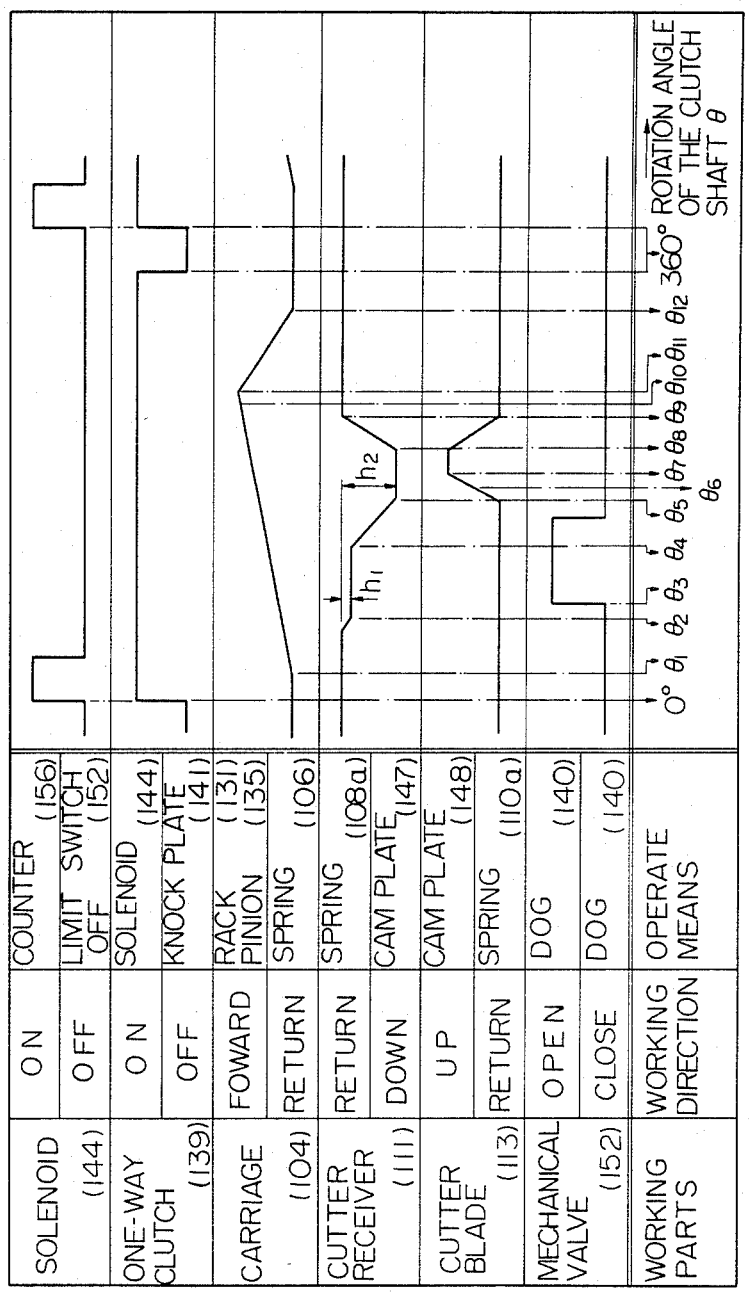
FIG. 8 is a chart of the timings of the parts during the cutting cycle in the apparatus shown in FIG. 4.

When the pinion 135 is rotated to $\theta_2$, the guide pin 149 runs on the first inclined face portion $C_1$ of the cam plate 147, and the cutter receiver 111 is brought down by $h_1$, as sown in FIGS. 8 and 9(b).

When the pinion 135 is rotated to $\theta_3$, the mechanical valve 152 opens the air passage and the air jet is ejected through the air ejecting holes 124a of the supporting block 124, whereby the corrugated member 11 is lifted slantingly toward the cutter receiver 111, as shown in FIG. 9(c).

Referring back now to FIGS. 7(a) through 7(c), when the line connecting the center $O_1$ of the arc of the crest portion of the corrugated member 11 and the center $O_2$ of the arc of the rounded edge portion of the cutter receiver 111 is not in agreement with the air ejection direction B, as shown in FIGS. 7(a) and 7(b), the crest portion of the corrugated member 11 is pressed against the lowest point of the rounded edge portion of the cutter receiver 111 by virtue of the air jet, and, therefore, the cutter receiver 111, is smoothly inserted into the adjacent trough portion of the corrugated member 11.

Figure 7B:
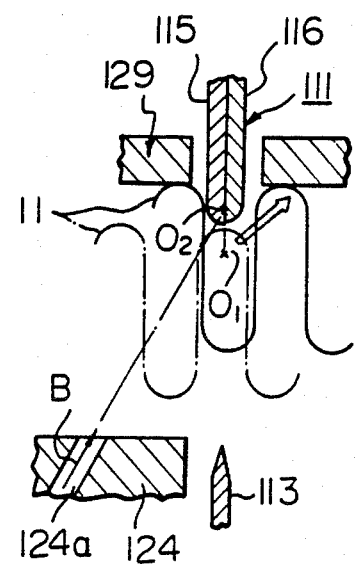
Figure 7C:
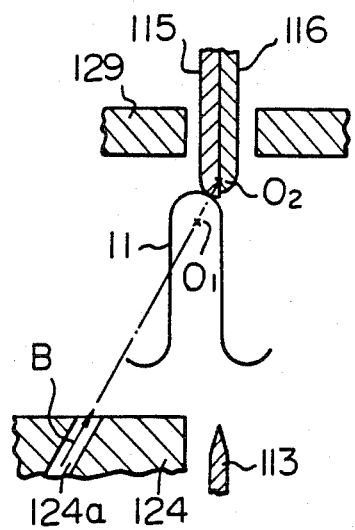

When the line connecting the centers $O_1$ and $O_2$ is in agreement with the air ejection direction B, as shown in FIG. 7(c), the crest portion of the corrugated member 11 abuts the rounded portion of the cutter receiver 111. Therefore, the crest portion of the corrugated member 11 is moved to the rear side of the cutter receiver 111 as the cutter receiver 111 is vertically brought down. Thus, the cutter receiver 111 is also smoothly inserted into the adjacent trough portion of the corrugated member 11.

More specifically, in each of the states shown in FIGS. 7(a) through 7(c), when the pinion 135 is rotated to $\theta_5$ and the cutter receiver 111 is brought down to the lowest position (the descending quantity is $h_2$), the cutter receiver 111 is inserted into the trough portion of the corrugated member 11, as shown in FIG. 9(d). The rounded edge portion of the cutter receiver 111 prevents crushing of louvers or crest portions due to catching of the cutter receiver 111 on the louvers of the corrugated member 11.

Since the slit of the cutter receiver 111 is closed when the cutter receiver 111 is inserted into the trough portion of the corrugated member 11, the insertion of the cutter receiver 111 is smoothly performed even if the distance between the two crest portions of the corrugated member 11 is narrow.

Raising of the corrugated member 11 by the air jet is continued until the cutter receiver 111 approaches the lowest position of its stroke.

Referring to FIG. 8 again, when the pinion 135 is rotated to $\theta_5$, the guide pin 159 runs on the inclined face portion $C_5$ of the cam plate 148. As the guide pin 150 rises along this inclined face portion $C_5$, the cutter blade 113 is raised, as shown in FIG. 9(e). When the pinion 135 is rotated to $\theta_7$, the cutter blade 113 reaches the highest position of the reciprocating stroke, whereby cutting of the corrugated member 11 is completed, as shown in FIG. 9(f).

Since the cutter blade 113 has a sharpened edge, no chips are formed when the corrugated member 11 is cut. A burr is formed in the cut end portion of the corrugated member 11, but since this burr is directed toward the inner side of the corrugated member 11, it is not caught by the supporting block 124 or the belts 120 when the corrugated member 11 is conveyed.

Since the slit of the cutter receiver 111 is opened before cutting of the corrugated member 11 is effected by the cutter blade 113, the top end portion of the sharpened edge of the cutter blade 113 is prevented from impinging against the cutter receiver 111. Therefore, the sharpened edge of the cutter blade 113 is not damaged by the cutter receiver.

When the pinion 135 is rotated to $\theta_8$, the guide pins 149 and 150 are separated from the cam faces 147a and 148a of the plates 147 and 148, respectively. When the pinion 135 is rotated to $\theta_9$, the guide blocks 108 and 110 are moved upward and downward by the spring 108a and 110a, respectively. Therefore, the cutter receiver 111 and the cutter blade 113 are returned to the uppermost position, respectively, as shown in FIG. 9(g).

When the pinion 135 is rotated to $\theta_{10}$, the pinion 135 is disengaged from the rack 131, and no driving force in the direction of arrow A is given to the carriage 104. When the pinion 135 is rotated to $\theta_{11}$, the carriage 104 is moved slightly forward by virtue of inertia. Then, the carriage 104 is moved toward the rest position by the spring, as the pinion 135 is rotated to $\theta_{12}$. When the carriage 104 is moved toward the rest position, the cam plates 147 and 148 are pushed by the guide pins 149 and 150 and are displaced as indicated by one-dot chain lines in FIGS. 5 and 6. After passage of the guide pines 149 and 150, the cam plates 147 and 148 are returned to their original positions by a spring (not shown).

When the pinion 135 makes one rotation, the knock plate 141 abuts on the step 104a of the trip cam 140, and the one-way clutch 139 becomes in the disconnecting state, whereby the rotation of the clutch shaft 134 and pinion 135 is stopped as the sprocket 136 is rotated by the power source. Thus, one cycle of the cutting operation is completed.

According to the above-mentioned cutting method, a corrugated member having a crest pitch e.g. 2 mm, corresponding to ½ of the crest pitch of a conventional corrugated member can be cut smoothly while coveying the corrugated member at the same speed as the speed adopted in the conventional method. In other words, the cutting operation can be performed at a conveying speed of 8000 crests per minute, which is twice as high as the conveying speed in the conventional method.

Incidentally, in the case where a step is not formed between the rounded edge portion of the two plates 115 and 116 of the cutter receiver 111 and also where the slit of the cutter receiver 111 is in an opened state when the cutter receiver abuts on the crest portion of the corrugated member, the crest portion of the corrugated member 11 is not moved to the front or rear side of the cutter receiver 111 in the conveying direction of the corrugated member 11, even if the air jet is ejected. Therefore, when the corrugated member 11 is cut, the crest portion is crushed.

As one means for removing this defect, there may be adopted a method in which the slit between the two plates 115 and 116 of the cutter receiver 111 is prevented from opening while the rounded edge portions of the two plates approach the crest portion of the corrugated member 11. In the above-mentioned embodiment, the pressing force adjusting members 117, 118, and 119 are effective for preventing the early formation of the above-mentioned opened slit.

As another means for removing the above-mentioned defect, there can be mentioned a method in which a step D is formed between the rounded edge portions of the two plates 115 and 116, as shown in detail in FIG. 10(a). In this case, if air is obliquely ejected in the direction B, it is preferable that the rounded edge portion of the rear side plate 115 be lower than that of the front side plate 116. If this structure is adopted, as shown in FIG. 10(b), even if the slit between the two plates 115 and 116 is opened when the rounded edges of the two plates 115 and 116 abut to the crest portion of the corrugated member, the two plates of the cutter receiver 111 are smoothly inserted into the adjacent trough portion of the corrugated member 11.

In the foregoing embodiment, an air jet is used for pushing the corrugated member 11 toward the cutter receiver 111, but other means, for example, other fluid jets of flexible members, such as springs, may be used instead of the air jet. Furthermore, in the case where no substantial pitch deviation is used while the corrugated member separates from the worm gear 101 and is cut, the above-mentioned pushing operation of the corrugated member toward the cutter receiver is not necessary. In this case, the alignment of the cutter receiver with the desired trough portion of the corrugated member can be obtained by just adjusting the timing for initiation of the movement of the carriage. Moreover, the driving source for the movement of the carriage, the cutter blade, and the cutter receiver may be replaced by a cylinder device.

I claim:

1. A method for cutting a continuous corrugated member into a predetermined length, said corrugated member having on each side face thereof a plurality of crest portions and trough portions extending in a direction perpendicular to a longitudinal direction thereof, comprising the steps of:

conveying said corrugated member in its longitudinal direction at a constant speed;

providing a movable cutter blade having thereon a sharpened edge which extends in a direction perpendicular to the longitudinal direction of said corrugated member and is located near one side face thereof;

moving said cutter blade forward from a predetermined rest position thereof in the conveying direction of said corrugated member at the same speed as the conveying speed thereof when a predetermined length of said corrugated member passes in front of said sharpened edge of said cutter blade;

reciprocating said cutter blade in a direction perpendicular to the conveying direction of said corrugated member and perpendicular to the extending direction of said crest portions for cutting said corrugated member when said cutter blade is moved forward; and returning said cutter blade to said rest position;

said method further comprising the steps of:

providing a movable cutter receiver having thereon a rounded edge which is located near the other side face of said corrugated member and extends in a direction perpendicular to the longitudinal direction of said corrugated member, said rounded edge being provided thereon with a slit for receiving said sharpened edge of said cutter blade;

moving said cutter receiver forward from a predetermined rest position thereof together with said cutter blade;

reciprocating said cutter receiver in a direction aligned with the reciprocating direction of said cutter blade for helping the cutting operation of said cutter blade when said cutter receiver is moved forward; and returning said cutter receiver to said rest position thereof together with said cutter blade;

said reciprocating of said cutter blade comprises advancing it toward the crest portion located on the one side face of said corrugated member for cutting the crest portion thereof;

said reciprocating of said cutter receiver comprises advancing it toward the trough portion before said cutter blade is advanced toward the corresponding crest portion and maintaining it in a position in which said rounded edge of said cutter receiver stays in the trough portion when said cutter blade is advanced through said corrugated member.

2. A method as claimed in claim 1, further comprising the step of opening said slit of said cutter receiver by means of said cutter blade when said cutter blade is advanced toward said corrugated member, said slit being closed when said cutter receiver is advanced toward the trough portion of said corrugated member so as to facilitate the advancement thereof.

3. A method as claimed in claim 1, further comprising the step of pushing said corrugated member obliquely toward said cutter receiver in an acute angle direction with respect to the advancing direction thereof when said rounded edge thereof approaches the adjacent crest portion located on the other side face of said corrugated member.

4. A method as claimed in claim 3, wherein said pushing of said corrugated member is effected by the use of an air jet ejected to said corrugated member.

5. A method as claimed in claim 1, wherein said corrugated member is a louver-forming corrugated fin for a heat exchanger.

6. An apparatus for cutting a continuous corrugated member into a predetermined length, said corrugated member having on each side face thereof a plurality of crest portions and trough portions extending in a direction perpendicular to longitudinal direction thereof, comprising:
  a means for conveying said corrugated member in its longitudinal direction at a constant speed;
  a carriage capable of reciprocating in a direction parallel to said conveying direction of said corrugated member;
  a movable cutter blade movably supported on said carriage in a direction perpendicular to said conveying direction and to said extending direction of said crest portions of said corrugated member, said cutter blade having thereon a sharpened edge which is located near one side face of said corrugated member and extends perpendicular to said conveying direction of said corrugated member;
  a drive means for moving forward said cutter blade together with said carriage from a rest position thereof in the same direction as said conveying direction of said corrugated member at the same speed as said conveying speed thereof when the predetermined length of said corrugated member passes in front of said sharpened edge of said cutter blade, and for returning said cutter blade to said rest position thereof together with said carriage; and
  a cutter-reciprocating means for reciprocating said cutter blade in a direction perpendicular to said conveying direction of said corrugated member for cutting the corrugated member when said cutter blade is moved forward;
  said apparatus further comprising a means for detecting the length of said corrugated member passed in front of said sharpened edge of said cutter blade when said cutter blade is located at said rest position thereof and for supplying an operation signal to said drive means when said predetermined length of said corrugated member passes in front of said sharpened edge of said cutter blade and
  wherein said detecting means comprises a detector for detecting the number of crest portions of the corrugated member moved forward and a counter for counting detection signals from said detector and supplying an operation signal to said drive means for moving said cutter carriage when a predetermined number of the crest portions is counted and
  wherein said drive means comprises a motor having a drive shaft, a clutch shaft connectable to said drive shaft, a one-way clutch for establishing and breaking the connection of said shafts, a solenoid for actuating said one-way clutch, said solenoid being operated by said operation signal sent from said detecting means and causing said one-way clutch to change into the connecting state so as to rotate said clutch shaft, said one-way clutch being formed to change into the disconnecting state when said clutch makes one rotation, a partially untoothed pinion secured to said clutch shaft, a rack secured to said carriage and capable of engagement with said pinion, said rack being moved together with said carriage in the same direction as said conveying direction of said corrugated member by means of said pinion when said clutch shaft is rotated, a spring for urging said carriage in a direction opposite to the conveying direction of said corrugated member so as to return said carriage to the predetermined rest position thereof, which rest position corresponds to the rest position of said cutter blade when the teeth of said pinion become disengaged from said rack, and a stopper for regulating the rest position of said carriage.

7. An apparatus as claimed in claim 6, wherein said cutter-reciprocating means comprises a member for supporting said cutter blade at the base end of said cutter blade, said member being slidably supported on said carriage in a direction perpendicular to the conveying direction of said corrugated member, a spring for urging said cutter support member in a direction retracting said cutter blade from said corrugated member, a cutter control pin secured to said cutter support member, and a cutter control cam arranged so that, when said carriage is moved forward, said cutter control cam acts on said cutter control pin to advance said cutter blade toward said corrugated member.

8. An apparatus as claimed in claim 6, further comprising a movable cutter receiver movably supported on said carriage in a direction aligned with the reciprocating direction of said cutter blade, said cutter receiver having thereon a rounded edge located near the other side face of said corrugated member, said rounded edge being provided with a slit formed on said round edge for receiving said cutter blade, and a means for reciprocating said cutter receiver in a direction aligned with the reciprocating direction of said cutter blade when said cutter blade is moved forward together with said cutter blade and said carriage.

9. An apparatus as claimed in claim 8, wherein said receiver-reciprocating means comprises a member for supporting said cutter receiver at base end of said cutter receiver, said member being slidably supported on said carriage in a direction perpendicular to the conveying direction of said corrugated member, a spring for urging said receiver support member in a direction retracting said cutter receiver from said corrugated member, a cutter control pin secured to said receiver support member, and a receiver control can arranged so that, when said carriage is moved forward, said receiver control cam acts on said receiver control pin to advance said cutter receiver toward said corrugated member.

10. An apparatus for cutting a continuous corrugated member into a predetermined length, said corrugated member having on each side face thereof a plurality of crest portions and trough portions extending in a direction perpendicular to longitudinal direction thereof, comprising:

a means for conveying said corrugated member in its longitudinal direction at a constant speed;

a carriage capable of reciprocating in a direction parallel to said conveying direction of said corrugated member;

a movable cutter blade movably supported on said carriage in a direction perpendicular to said conveying direction and to said extending direction of said crest portions of said corrugated member, said cutter blade having thereon a sharpened edge which is located near one side face of said corrugated member and extends perpendicular to said conveying direction of said corrugated member;

a drive means for moving forward said cutter blade together with said carriage from a rest position thereof in the same direction as said conveying direction of said corrugated member at the same speed as said conveying speed thereof when the predetermined length of said corrugated member passes in front of said sharpened edge of said cutter blade, and for returning said cutter blade to said rest position thereof together with said carriage; and a cutter-reciprocating means for reciprocating said cutter blade in a direction perpendicular to said conveying direction of said corrugated member for cutting the corrugated member when said cutter blade is moved forward;

said apparatus further comprising a movable cutter receiver, movably supported on said carriage in a direction aligned with the reciprocating direction of said cutter blade, said cutter receiver having thereon a rounded edge located near the other side face of said corrugated member, said rounded edge being provided with a slit formed on said round edge for receiving said cutter blade, and a means for reciprocating said cutter receiver in a direction aligned with the reciprocating direction of said cutter blade when said cutter blade is moved forward together with said cutter blade and said carriage, said cutter receiver being formed of two plates which are piled together and secured to said receiver support member at each base end thereof, said plates being provided on top ends thereof with a pair of gripping face portions for gripping said cutter blade therebetween, said rounded edge being arranged between the base ends of the top ends of said two plates, and said slit being formed between said two plates.

11. An apparatus as claimed in claim 10, wherein said two plates are arranged so that said slit is opened by said cutter blade when said sharpened edge of said cutter blade advances toward the rounded edges of said two plates, said slit being substantially closed when said two plates are advanced toward the trough portion so as to facilitate the advancement thereof.

12. An apparatus as claimed in claim 10, wherein said rounded edges of said two plates are staggered from each other in a direction aligned with the advancing direction of said cutter receiver.

13. An apparatus for cutting a continuous corrugated member into a predetermined length, said corrugated member having on each side face thereof a plurality of crest portions and trough portions extending in a direction perpendicular to a longitudinal direction thereof, comprising:

a means for conveying said corrugated member in its longitudinal direction at a constant speed;

a movable cutter blade for cutting said corrugated member at the crest portion of one side face thereof, said cutter blade having thereon a sharpened edge which extends in a direction perpendicular to the longitudinal direction of said corrugated member and is located near said one side face thereof;

a movable cutter receiver located near the other side face of said corrugated member and having thereon a rounded edge which is engageable with the trough portion of said other side face of said corrugated member, and being provided with a slit formed on said rounded edge for receiving said sharpened edge of said cutter blade;

a carriage for movably supporting said cutter blade and said cutter receiver in a direction perpendicular to the conveying direction of said corrugated member and perpendicular to the extending direction of said crest portions, said carriage being movable in a direction parallel to the conveying direction of said corrugated member;

a drive means for moving forward said carriage together with said cutter blade and said cutter receiver from a predetermined rest position thereof in the same direction as the conveying direction of said corrugated member at the same speed as the conveying speed thereof when a predetermined length of said corrugated member passes in front of said sharpened edge of said cutter blade, and for returning said carriage to said rest position together with said cutter blade and said cutter receiver;

first actuating means for engaging said rounded edge of said cutter receiver with said trough portion of said other side face of said corrugated member when said cutter blade and said cutter receiver are moved forward together with said carriage; and a second actuating means for moving said cutter blade through said corrugated member into said slit of said cutter receiver to cut said corrugated member at the crest portion of said one side face thereof when said cutter blade and said cutter receiver are moved forward together with said carriage.

14. An apparatus as claimed in claim 13, wherein said rounded edges of said cutter receiver extend in parallel to the extending direction of said trough portion of said corrugated member, said sharpened edge of said cutter blade extending slantingly from the base end thereof toward the top end thereof in a direction drawing near to said corrugated member.

15. An apparatus as claimed in claim 13, wherein said corrugated member is a louver-forming corrugated fin for a heat exchanger.

16. An apparatus as claimed in claim 13, further comprising a means for detecting the length of said corrugated member passed in front of said sharpened edge of said cutter blade when said cutter blade is located at said rest position thereof and for supplying an operation signal to said drive means when said predetermined length of said corrugated member passes in front of said sharpened edge of said cutter blade.

17. An apparatus as claimed in claim 16, wherein said detecting means comprises a detector for detecting the number of crest portions of the corrugated member moved forward and a counter for counting detection signals from said detector and supplying an operation signal to said drive means for moving said cutter carriage when a predetermined number of the crest portions is counted.

18. An apparatus as claimed in claim 13, wherein said receiver-reciprocating means comprises a member for supporting said cutter receiver at base end of said cutter receiver, said member being slidably supported on said carriage in a direction perpendicular to the conveying direction of said corrugated member, a spring for urging said receiver support member in a direction retracting said cutter receiver from said corrugated member, a cutter control pin secured to said receiver support member, and a receiver control cam arranged so that, when said carriage is moved forward, said receiver control cam acts on said receiver control pin to advance said cutter receiver toward said corrugated member.

19. An apparatus for cutting a continuous corrugated member into a predetermined length, said corrugated member having on each side face thereof a plurality of crest portions and trough portions extending in a direction perpendicular to longitudinal direction thereof, comprising:
- a means for conveying said corrugated member in its longitudinal direction at a constant speed;
- a carriage capable of reciprocating in a direction parallel to said conveying direction of said corrugated member;
- a movable cutter blade movably supported on said carriage in a direction perpendicular to said conveying direction and to said extending direction of said crest portions of said corrugated member, said cutter blade having thereon a sharpened edge which is located near one side face of said corrugated member and extends perpendicular to said conveying direction of said corrugated member;
- a drive means for moving forward said cutter blade together with said carriage from a rest position thereof in the same direction as said conveying direction of said corrugated member at the same speed as said conveying speed thereof when the predetermined length of said corrugated member passes in front of said sharpened edge of said cutter blade, and for returning said cutter blade to said rest position thereof together with said carriage; and
- a cutter-reciprocating means for reciprocating said cutter blade in a direction perpendicular to said conveying direction of said corrugated member for cutting the corrugated member when said cutter blade is moved forward;

said apparatus further comprising a movable cutter receiver movably supported on said carriage in a direction aligned with the reciprocating direction of said cutter blade, said cutter receiver having thereon a rounded edge located near the other side face of said corrugated member, said rounded edge being provided with a slit formed on said round edge for receiving said cutter blade, and a means for reciprocating said cutter receiver in a direction aligned with the reciprocating direction of said cutter blade when said cutter blade is moved forward together with said cutter blade and said carriage, and a means for pushing said corrugated member obliquely toward said cutter receiver in an acute angle direction with respect to the advancing direction of said cutter receiver when said round edge of said cutter receiver approaches the corner portion located on the other side of said corrugated member in the advancing operation of said cutter receiver toward said corrugated member.

20. An apparatus as claimed in claim 19, wherein said pushing means comprises a device for ejecting an air jet to said corrugated member in an acute angle direction with respect to the advancing direction of said cutter receiver from the one side face of said corrugated member.

* * * * *

UNITED STATES PATENT AND TRADEMARK OFFICE
CERTIFICATE OF CORRECTION

PATENT NO. : 4,523,500
DATED : June 18, 1985
INVENTOR(S) : Kimio MARUYAMA

It is certified that error appears in the above-identified patent and that said Letters Patent is hereby corrected as shown below:

At column 12, line 67, change "can" to --cam--.

At column 12, line 66, change "cutter" to --receiver--.

At column 15, line 2], change "cutter" to --receiver--.

Signed and Sealed this

Fourteenth Day of January 1986

[SEAL]

Attest:

DONALD J. QUIGG

Attesting Officer

Commissioner of Patents and Trademarks